United States Patent [19]

Parr, Jr. et al.

[11] Patent Number: 4,989,748
[45] Date of Patent: Feb. 5, 1991

[54] MOISTURE RECIRCULATING COVER FOR MICROWAVE OVEN DISH

[76] Inventors: Guy H. Parr, Jr., 116 Ridgewood Rd., Baltimore, Md. 21210; Robert F. Prettyman, 710 Wesley Rd., Glen Burnie, Md. 21061

[21] Appl. No.: 504,206
[22] Filed: Apr. 4, 1990
[51] Int. Cl.⁵ .............................................. B65D 51/02
[52] U.S. Cl. .................................... 220/367; 220/287; 220/369; 219/10.55 E
[58] Field of Search ............... 220/367, 287, 369, 377, 220/380, 209

[56] References Cited

U.S. PATENT DOCUMENTS

| | | | |
|---|---|---|---|
| 947,098 | 1/1910 | Ellis | 220/287 |
| 2,636,636 | 4/1953 | Smith | 220/369 |
| 2,664,169 | 12/1953 | Misener et al. | 220/369 X |
| 2,760,672 | 8/1956 | Cronheim | 220/287 |
| 3,955,710 | 5/1976 | Commisso | 220/306 X |
| 4,298,131 | 11/1981 | Saito et al. | 220/369 X |
| 4,530,440 | 7/1985 | Leong | 220/209 X |
| 4,700,689 | 10/1987 | Speker | 220/287 X |
| 4,801,773 | 1/1989 | Hanlon | 220/367 X |

FOREIGN PATENT DOCUMENTS 253666  6/1926  United Kingdom ............. 220/287

*Primary Examiner*—Stephen Marcus
*Assistant Examiner*—Vanessa M. Roberts
*Attorney, Agent, or Firm*—Sughrue, Mion, Zinn, Macpeak & Seas

[57] ABSTRACT

The cone-shaped or dome-shaped sheet of waxed paper or freezer paper having a moisture retarding coating on at least the surface of the paper facing an underlying dish bearing food and positioned within a microwave oven, and being microwave transparent traps moisture condensing on the interior surface thereof for revaporization for return to the food being heated and/or cooked while preventing the dripping of condensed moisture directly onto the food within the underlying dish. Preferably the conical or dome-shaped cover is mechanically embossed to form vertically spaced annular concave cavities facing inwardly to trap the moisture running by gravity down the interior surface of the cover within the cavities for revaporization. Additionally, circumferentially spaced reinforcing ribs may be formed over the height of the cover to maintain the cover one or dome shaped configuration throughout the microwave oven heating process. An open mesh frame may be employed for supporting the cover overlying the dish bearing the food. Integral flaps cut out of the cover about three sides, with the exception of a horizontal hinge allow the flaps to open outwardly and curl upwardly under excessive moisture accumulation within the cover, and to close upon cooling of the cover at termination of the microwave oven operation. A unitary, folded under, reinforcing lip at the bottom of the conical or dome-shaped cover captures condensed moisture to facilitate revaporization and return of all moisture to the food being heated or cooked.

18 Claims, 2 Drawing Sheets

MOISTURE RECIRCULATING COVER FOR MICROWAVE OVEN DISH

FIELD OF THE INVENTION

The invention relates to dish covers for food dishes subjected to heating within microwave ovens and more particularly to a light weight disposable dish cover which functions to recirculate moisture emanating from the food during microwave heating or cooking.

BACKGROUND OF THE INVENTION

Microwave cooking is now an accepted method of preparing foods with approximately 50% of the U.S. households having a microwave oven.

The typical microwave oven does not confine moisture but instead readily, and in most cases forcibly, circulates air through and away from the oven cavity. Because of the forced circulation and due to the cavity area being relatively large as compared with the food or other material being heated, a large percentage of the moisture contained in the heated material is lost to the surrounding atmosphere.

Most foods have a critical moisture content required for edibility, thus it is especially desirable that the moisture given off from the heated product not drip back into the food since it renders the food soggy or collects in the base of the container, which can spoil the product by changing its consistency and palatability.

Various products have been devised for covering the dish during cooking or reheating of foods within microwave ovens. The propensity of food when heated to give off hot vapors such as steam has long been recognized. U.S. Pat. No. 3,955,710 teaches the use of a foam polystyrene cover of dish form which, when inverted and coupled to an underlying dish functions to maintain the hot food hot for a significant period of time. In such a cover, apertures provide vent openings to allow for the escape of hot vapors such as steam, which may be given off when the hot food items are enclosed by such covers.

U.S. Pat. No. 4,495,392 teaches microwave cooking systems consisting of a thermally insulated holder for foods having a thermally reflective shield for reflecting thermal radiation from the food to thereby reduce loss of heat by radiation through the thermal insulation layer while providing for the propagation of microwave energy into the food through the thermal insulating portion of the food holder. Specifically a container is provided with thick walls of low microwave loss material such as alundum having portions of the inside or outside of the container coated with a layer which reflects radiated infrared energy back into the food.

U.S. Pat. No. 4,705,927 teaches a microwave oven cooking utensil utilizing a water absorbing member underlying a microwave opaque cooking container with the container covered by a microwave transparent top. Water in the saturated absorbent pad is quickly heated by microwave exposure and converted to steam which contacts the exterior surfaces of the bottom and side wall of the container to facilitate thawing of the food (frozen) within the dish.

U.S. Pat. No. 4,721,140 teaches a flat, rectangular plan configured cover for placement across the open top of a dish with the edge of the cover overlapping the edge of the dish. The cover is preferably formed as a sheet of open weave material such as polyester and includes weights at the corners for holding the cover in place to prevent food spattering during heating of foods therein.

U.S. Pat. No. 4,797,523 teaches a cellulose hydrate film which is microwave transparent applied by stretching the same across the open top of a bowl or dish and having a plurality of ventilation holes therein. The film is dried when heated by microwave radiation and stretches over the container opening. The air expanding within the container may escape through the ventilation holes.

U.S. Pat. No. 4,801,773 teaches a cover with a flat top and tapered sides of oval, rectangular or circular top configuration, formed of light weight, moisture absorbent material which is readily disposable and which functions to eliminate extensive soiling of the interior of the oven by preventing food spattering.

While the shrouds or covers of the prior art, as exemplified by the patents above, function to produce certain beneficial effects, limited to spattering prevention, release of moisture from the chamber formed by the shroud or cover and the dish, the patents are devoid of the recognition of the need for critical moisture content of the food being heated or cooked, the necessity to prevent moisture dripping back into the food and need for release of excess moisture where necessary from the chamber defined by the cover and dish while providing a cover which is of low cost, low mass and which is readily disposable. For instance, the applicants discovered that if one merely inverts a bowl on a plate of food to be heated in a microwave oven, the moisture evolving from the food and condensing on the inner wall of the bowl will particularly drip back onto the food from the flat bottom of the bowl and further, where the inner wall is downwardly and outwardly inclined, will flow by gravity onto the food about the periphery of the dish supporting the upended bowl.

It is therefore a primary object of the present invention to provide a disposable food cover for covering a plate of food during heating or cooking within a microwave oven, which is formed of a moisture resistant material to minimize absorption of the moisture removed from the food during cooking or heating, which is structurally reinforced to provide structural strength, which facilitates the collection of condensate and traps the same for revaporization, which automatically permits the escape of excessive moisture, which is highly disposable, easily crushed and preferably biodegradable, which enhances stackability of the covers, and which has sufficient insulative property to retain heat during and after the time of food preparation, and which is of low cost.

DESCRIPTION OF THE PREFERRED EMBODIMENTS

Figure 1:
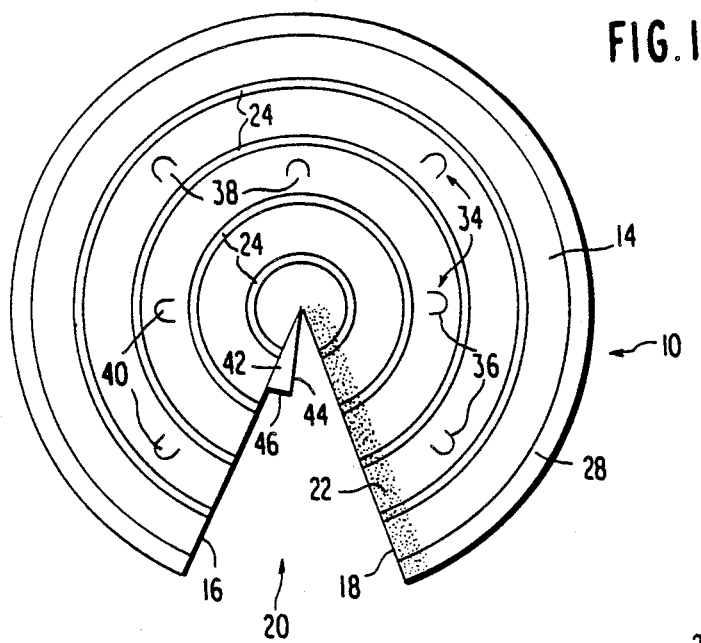
FIG. 1 is a top plan view of a circular piece of waxed paper with a radial slit prior to edge overlap sealing to form a conical food cover forming a preferred embodiment of the moisture recirculating cover of the present invention.
Figure 2:
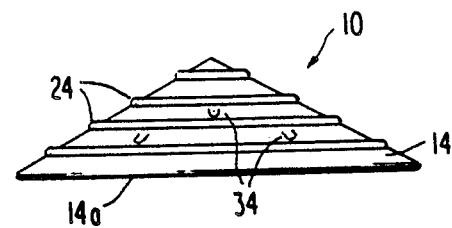
FIG. 2 is a side elevational view of the cover of FIG. 1.
Figure 3A:
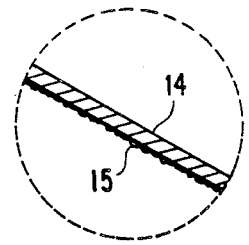
FIG. 3 is a sectional view of the cone-shaped cover of FIGS. 1 and 2 showing the fold under lip for trapping condensate, a circular weight captured therein for weighting the base of the cone-shaped cover, and vapor release flaps in open position as the result of heat and moisture contacting the same during use.
Figure 3:
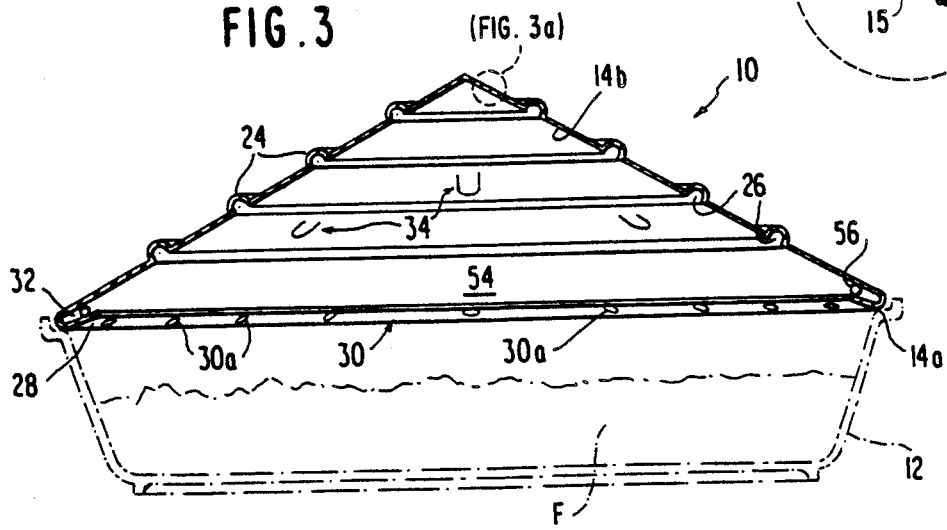

Referring to drawing FIGS. 1, 2 and 3, a preferred embodiment of the present invention takes the form of a moisture recirculating cover 10, formed from a circular piece 14 of a very thin paper sheet which is moisture resistant, particularly the inside face of the cover when positioned on top of a food dish indicated generally at 12. FIG. 3. In the embodiment of FIGS. 1, 2 and 3, the circular piece 14 is a piece of waxed paper having applied a moisture resistant coating on one side or both sides thereof. A one side wet paper has the wax applied solely to one side of the wet from which the circular piece 14 is cut. Alternatively the waxed paper may be a two-side wet paper. Typically the waxed paper may be 27 lb. weight paper; with an 18 lb. base paper having applied thereto a 9 lb. wax coating, and being of 2.2 mill thickness. The circular piece 14 may be cut with a single radial slit; however, as shown in FIG. 1 there is a sector shaped piece cut out from the circular piece 14, removed by circumferentially spaced intersecting cut lines 16, 18 forming a pie-shaped opening 20 therebetween.

Further, in giving a conical form to the cover 10, the radial cut edge 16 is caused to overlap radial cut edge 18 over a surface area indicated generally at 22, and the facing portions of the cover 14 are bonded together by heat sealing or by a suitable adhesive. Alternatively, instead of being a circular piece of waxed paper, piece 14 may be formed of standard freezer paper. Freezer paper differs from waxed paper in that in the freezer paper the base paper sheet has applied thereto, on one face only, a plastic coating which renders that surface of the sheet non-liquid absorbent. It is that plastic coated face which is required to be proximate to the dish bearing the food F, FIG. 3.

In the illustrated embodiment, the circular piece of waxed paper may be of 12" diameter, providing a conical height of 2¾" and resulting in a cone having a diameter of about 10" at its base 14a. In the illustrated embodiment of FIGS. 1-3, means are provided for structurally reinforcing the thin paper cover 10. Further, means are provided for trapping moisture condensing on the interior surface 14b of the cone-shaped cover 10 and for facilitating the revaporization of such condensed moisture as well as means for preventing the dripping of condensed moisture onto the underlying food F within dish 12. In the embodiment of FIGS. 1, 2 and 3, both the revaporizing means and the moisture trapping means are constituted by a plurality of vertically spaced, concentric embossed as localized surface portions of the circular piece of paper 14, in this case, the embossments 24 are of concentric ring form. Such embossments 24 may be formed by pressing concentric wire rings against the circular piece 14 of waxed paper or freezer paper. The embossments form spaced radially inwardly directed concave grooves within the interior surface 14b of the conical form cover 10.

During heating or cooking of the food F, the moisture escapes the food as vapor which impacts against the conical interior surface 14b of the cover 10. FIG. 3 and condensate thereof. Any uninhibited droplets run by gravity downwardly along the tapered, inclined walls and accumulates within the ring like cavities 26 formed by the embossments 24. The heat causes the retained moisture to be revaporized so that the vapor constantly circulates in contact with the surface of the food to maintain the proper moisture content within the food.

The following is an explanation of the mechanism of droplet formation and its relevance to the materials selected for this invention.

the condensation of droplets in a volume of space containing microwave radiation is modified by the absorption and re-emission of this radiation. A droplet in vacuum will absorb energy at a rate which is proportional to its volume:

$$(dP/dt)_{gain} = cO*r**3$$

where P is power, r is the droplet radius, and cO is a constant. At the same time, it loses energy through its surface at a rate $$(dP/dt)_{lost} = -c1*r**2$$

where c1 is another constant. This says that the power absorbed reaches a steady value when $$cO*r**3 = c1*r**2$$

or $$r_{eq} = c1/c2$$

Now, consider a droplet on a surface, and assume that heat is removed from it at a constant rate Q by thermal conduction. Clearly Q also is proportional to the droplet area (roughly) through the area of contact with the surface: then if $$A = c3*r**2$$

where c3 is a constant which is characteristic of the surface material, we have $$(dP/dt)_{lost} = -(c1 + c3)*r**2$$

so the equilibrium droplet size is $$r_{eq} = (c1 + c3)/c2 > c1/c2$$

Therefore the presence of a surface always results in larger droplets.

Now, it can be shown that if the surface is one side of a layer of thickness L, the constant c3 is proportional to L; this is because the rate of heat transfer from the point where the droplet forms is determined by how much material the heat must pass through, which is in turn proportional to the layer width. Then a small L results in a small $c_3$, so that the equilibrium droplet radius is decreased.

When the equilibrium droplet radius becomes smaller than a certain critical value, another phenomenon occurs. Condensation of a droplet requires that the droplet be in equilibrium with its own vapor: it is possible to show that this implies a critical size for droplets, below which they tend to evaporate and above which they tend to grow. If the equilibrium radius we have calculated above is too small, then no droplet can ever reach the size at which it can grow further; this implies that the condensation can never occur at all. This is most likely the normal state of affairs in the microwave volume itself; however, addition of the condensation layer can clearly increase the equilibrium radius past its critical value. This underlines the importance of decreasing the constant $c_3$: by making $c_3$ small enough, we can reduce the droplet radius below critical on the condensing surface as well as in the volume thereby inhibiting the condensation.

In the illustrated embodiment, FIGS. 1-3, the radial peripheral edge 28 of the circular piece of material 14 is folded under the cone-shaped cover 10 to produce an upwardly and inwardly oblique reinforcing lip indicated generally at 30. Where the circular piece of material 14 is formed of waxed paper, the lip 30 is preferredly spot bonded at circumferentially spaced positions to the interior surface 14b of the cone to maintain the lip 30 in a U-shaped configuration shown at FIG. 3 so as to capture whatever condensed moisture reaches that lip prior to evaporation during gravity flow and preferably within cavities 26.

The moisture recirculating cover of the present invention is designed to protect the food by first being formed with a very thin wall, thereby reducing the amount of moisture which is condensed on the interior surface 14b of the conical form cover 10. The applicants have determined that a low mass reaches thermal equilibrium more quickly than a high mass or thick walled container (such as styrofoam), thereby causing less condensation. Secondly, the moisture recirculating cover of the present invention protects the food from being rendered soggy by "trapping moisture" at vertically spaced positions along the interior surface of the conical form cover 10 by causing that moisture to run into the ring like cavities 26 created by the embossments 24.

A "primary trap" is constituted by the collection of droplets at nodes 15 formed by irregular application of wax or plastic coating on the interior surface of the paper 14 or by embossing the interior surface 14b of the circular piece of paper 14. A "secondary trap" is formed by the embossed concentric rings, specifically the concave cavities 26 formed by the embossments 24, which define collection volumes limiting downward movement of condensates to a distance from one of the concentric rings 24 to another. A "third trap" is formed by the folded lip 30 which functions as a container for any runoff prior to entry into the annular cavity 32 formed by the outwardly sloping interior surface 14b of the cover 10 and the upwardly and inwardly oblique lip 28.

The primary object of the present invention is to return as much moisture as possible to the environment of the food without liquid dripping on the food and rendering a portion of that food soggy.

Another aspect of the present invention resides in the inclusion of partial cutouts or windows indicated generally at 34 formed by U-shaped or rectangular cuts 36 within the circular piece of paper 14, but leaving uncut transverse edges 38 functioning as hinges for the flaps 40 defined thereby. Prior to heating or cooking of the food F and operation of the microwave oven (not shown) within which the food F, the dish 12 and cover 10 reside the flaps 40 are closed. The flaps 40 for the windows 34 open automatically as the temperature and moisture level rises within the cover. The flaps and windows are formed by cutting three sides of a portion of the sheet material, and leaving the flap connected along a fourth side (horizontal). In the illustrated form, the flaps are of rectangular shape, with the upper horizontal side of the flap, integral with the rectangular piece 14 and forming hinge 38. Automatically, the presence of heated moist air at the inner surface of the flap, causes each flap 40 to curl outwardly and upwardly as indicated in dotted lines. FIG. 3. The heated atmosphere forces the excess moisture to escape through windows 34. The amount of moisture escaping is controlled by the combined area of the various flaps 40.

It is noted in FIG. 1 that in the making of the radial cuts 16, 18, a portion of the rectangular piece of paper 14 is retained to form a lift or handling tab 42, which tab 42 is partially severed from the piece of material 14 about opposite sides 42, 44 and across a radially outboard end 46, leaving a narrow end portion attached to the sheet 14. When the cone is formed by sealing overlapped edges 16 18 of the piece 14 of material, the tab 42 projects outwardly from the top or apex of the cone-shaped cover 10 to permit handling.

Figure 4:
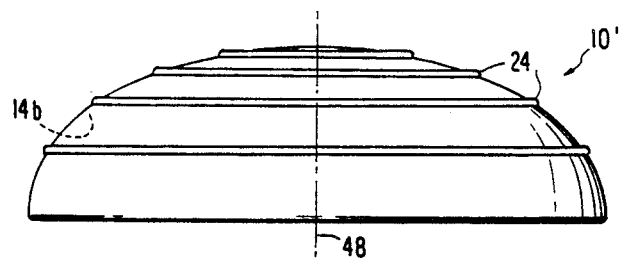
FIG. 4 is a side elevational view of an alternate embodiment of the present invention, in which the cover is of dome shape.

Turning to FIG. 4, an alternate form of moisture recirculating cover 10' is shown. In the various embodiments of the moisture recirculating microwave oven dish cover, like numerals are employed for like elements. Again, cover 10 has ring-like embossments 24 on the outer surface; however, in this case the cover 10' is dome shaped rather than conical. As such, the interior surface 14b, at all points slopes downwardly and outwardly from a vertical axis 48, with the cover being symmetrical about that axis in a similar fashion to the conical embodiment of FIGS. 1-3, inclusive. In the embodiments of FIGS. 1-4. inclusive, there is, therefore, produced an inexpensive, disposable, free form microwave oven food cover which prevents spattering and which is of minimal material cost since waxed paper retails at about one penny per square foot. Construction costs are minimized by either heat sealing of the overlapped edges of the waxed paper piece 19 of material or by gluing the overlapped edges of the freezer paper used in lieu of the waxed paper. Costs are increased where freezer paper is used since freezer paper is about twice as expensive as waxed paper. The advantages of the product formed of freezer paper are its aesthetic superiority, its ability to retain the cone or dome shape, its ease in folding and its ability to retain color designs on the exterior surface thereof, such as animal figures, flower patterns or commercial advertisements.

In either case, the cover may be readily disposed of, and it functions to a high degree to retain the desired moisture of the food being cooked or heated.

Further, it readily replaces conventional microwavable plastic wraps. The consumer often fails to use plastic wrap because of the inconvenience of finding the boxed material, dispensing the material and wrapping the plate or dish with the material prior to use. The applicant's pre-formed disposable product offers distinct advantages over plastic wrap. A large number of the conical or dome-shaped covers may be stacked and disposed from a hollow, cylindrical disposal tube which may be easily fitted to the top of a microwave oven.

Alternatively, the conical or dome-shaped covers 10, 10' respectively, may bear serrations or folds forming a fluted external surface for cover structure reinforcement. Preferably, such fluted cover would also include the embossments forming the concentric, vertically spaced rings for the creation of the annular cavities 26 for receiving and holding moisture running down the sides of the cone-shaped or dome-shaped cover until revaporization of the condensed moisture occurs during use as described above.

In the formation of the covers from freezer paper, the overlapping edges at cuts 16, 18 are preferably glued by conventional glues such as Adhesive Track Designation No. 33-1657 as supplied by the National Starch and Chemical Company of Bridgewater, N.J. The applicants have also determined that by employing bright highly visible colors in adding figures, flowers or the like, to the outer surface of the conical or dome-shaped overs the bright, highly visible imagery enhanced the aesthetic appearance of the cover. Water soluble inks are incapable of adhering to waxed paper, although permanent, oil-based ink markers provide color imaging to an acceptable degree. The presence of the figures provide a carousel effect, particularly where the microwave ovens have a rotating disk-shaped platform for supporting the food carrying dish to facilitate even heating or cooking of the food within the dish to which the cover has application. By forming and sealing the overlapped edges 16, 18 of the cone (or equivalent edges of the dome-type cover) the cover is rendered as water tight as possible to facilitate the retention of moisture within the cover interior. By uniform surface embossment or selective application of coating to the interior surface 14b of the covers, the water vapor from the food condenses to form small droplets on the interior surface. Additionally, water moisture which is not held firmly to the cone by surface tension can be recaptured and held by the folded lip 30 along the bottom edge 14a of the cover until the moisture is again vaporized. The ring type embossments 24 or their equivalent causes retention of moisture at an intermediate level for revaporization while the balance reaches the folded back lip 30, under gravity influence.

Figure 5:
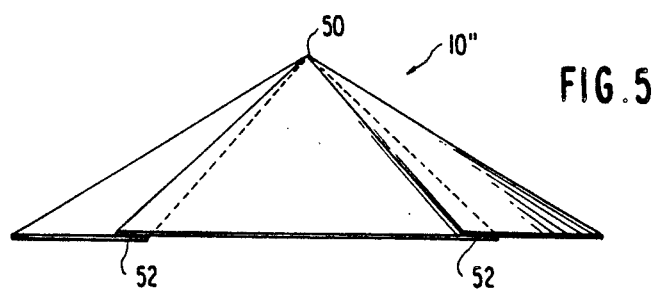
FIG. 5 is a front elevational view of a further embodiment of the present invention in which a thin cone-shaped moisture recirculating cover is formed with plural disposable paper circumferentially spaced ribs as structural reinforcements.
Figure 6:
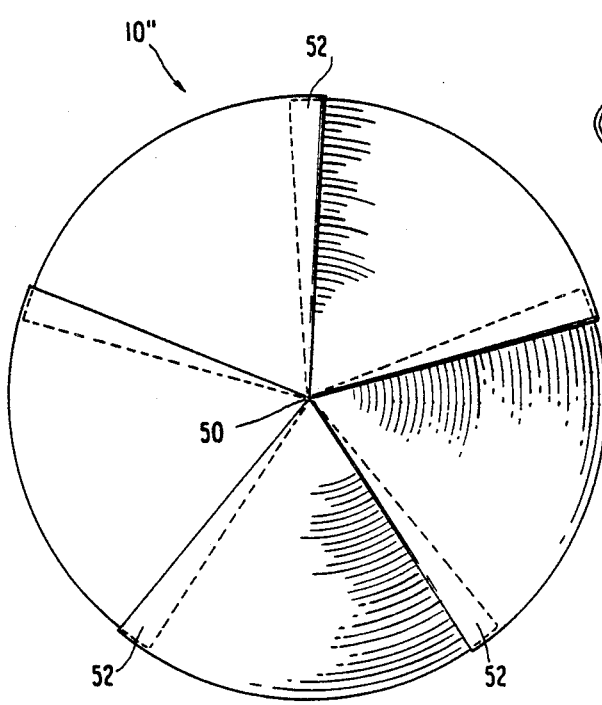
FIG. 6 is a top plan view of the cover of FIG. 5.

FIGS. 5 and 6 illustrate an alternative form of cone-shaped cover 10" in which five circumferentially spaced ribs are formed emanating from the apex 50 of the conical cover, and formed by zig zag overlapping of portions of the circular sheet as at 52, enhancing the rigidity of the structure while adding little mass to the thin, conical element of insulating material.

In the various embodiments, the flaps such as 40, may be added to reduce the moisture automatically while retaining some insulative property. With the flaps opening once the pressure within the cone is sufficiently high to raise the flaps and with the moisture content sufficient to cause the flap to curl (as a result of the inherent tendency for paper to curl upon moisture application thereto), excessive moisture vapor is automatically released at times of high moisture content in vapor form within the chamber 54 defined by the cover 10 and the underlying dish 12 bearing the food F.

Once the heated moist air is reduced on the inside of cover 10 by dropping the microwave energy level below a certain threshold, the flaps fall back into place, thus restoring the insulative property of the conical structure. The advantage of the windowed cone with automatic flap closure and entry is that the structure is moisture-releasing without significant loss of the insulative property of the cover. Additionally, upon opening of the flaps, the user is visually aware of the food having been heated to a given degree. It has been found that such flaps "pop open" evidencing the heating of the food to a desired temperature, indicative of proper reheating or proper cooking of the food F borne by the dish 12.

The drawback inherent in the use of such flaps where the user desires to retain as much of the moisture as possible can be overcome by simply taping over the flaps 40 or by using a second windowed cover stacked atop the first one, but circumferentially offset so that a non-flap portion of the overlying cone covers the flap area of the first case to prevent the flaps of the first case from curling outwardly and upwardly, i.e., opening under moisture accumulation within cavity 54.

In the embodiment of FIGS. 1-3 an additional weight in the form of a circular non-metal ring 56 is supported by the folded under flap 30, causing the lower edge 14a of the cover 10 to sealably engage the edge of the dish 12 to prevent possible moisture vapor escape along the bottom edge 14a of the cone-shaped cover 10. The weight alternatively can be formed by a thin plastic ring placed over the cone apex and contacting the exterior of the cone-shaped cover 10 adjacent to the base.

Figure 7:
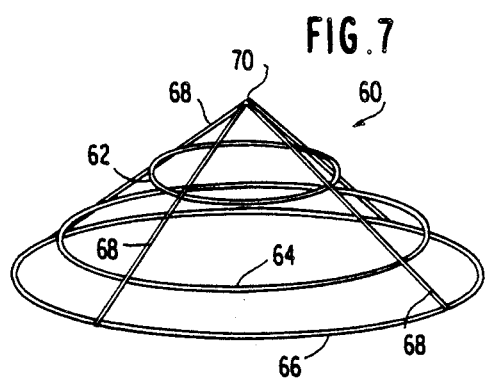
FIG. 7 is a perspective view of an open frame for supporting the cover of FIGS. 1, 2 and 3.

FIG. 7 illustrates a conical, open mesh frame sized to the dimensions of the cover 10. FIGS. 1-3, and suitable for supporting the thin treated paper material constituting the circular piece 14 from which the conical form cover 10 is produced. The frame is formed of a series of varying diameter non-metallic plastic or otherwise microwave acceptable rings 62, 64 and 66 along with a plurality of straight plastic risers 68 which are thermo welded to the rings at points along the length of the risers. The risers 60 are welded at one end to each other at apex 70. The welds are formed of a material which has a high melting point, to prevent the disintegration of the frame during use.

Further, the use of an open mesh conical frame 60 facilitates the removal of the single cover from a stack of such covers by the simple expedient of inserting the mesh frame 60 into the open end of the lowermost conical form cover of a stack of such covers 10, whereupon the frictional engagement between frame 60 and cover 10 permits the manual removal of the frame with a single cover frictionally attached thereto. Additionally, by placement of the lowermost ring 64 within the fold under lip 30, the open wire frame 60 provides the weight necessary to maintain the seal between the lower edge 14a of the cover 10 and the dish 12 upon which the cover rests. Further, if desired the fold under lip 30 may have perforations 30a within the annular portion 28 of the circular piece of paper 14 from which the conical shape cover 10 is formed. The perforations provide the controlled return of condensate to the chamber 54 as required.

From the description above, it is evident that the various disposable food covers for microwave use are particularly designed and operate efficiently to recirculate the moisture given off by the food during heating or cooking within the microwave oven and that the paper forming the cover is sufficiently moisture resistant to minimize absorption of the moisture by the cover itself. The waxed paper or freezer paper, preferably forming the conical form or dome-shaped cover covers 10, 10', 10", results in an extremely low cost product, enhancing disposability and manual crushing and the waxed paper is highly biodegradable and forms a preferred material for the product of the invention. The dome-shaped or conical configuration enhances stackability which is also enhanced due to the thinness of the sheet material forming the covers. The product is symmetrical, lends itself to stacking in minimum space which is a major concern in the retail sales where shelf space is at a premium.

If desired the structure may be multilayered, with one or more additional layers enhanced by an air space therebetween to improve the thermal insulation characteristic of the covers. The covers are highlighted by the utilization of concentric raised embossment of ring or annular form around either the conical or dome-shaped cover, which add both structural strength to the cover and facilitates the collection of condensate for revaporization within the chamber or cavity 54 partially defined by the cover. Further, the automatic vent flaps allow the escape of excessive moisture with closing and opening correlated to moisture and heat content within the chamber.

It should be understood and appreciated that various substitutions, modifications and changes may be made in light of the above teachings. It is, therefore, to be understood that the invention as taught and described herein is only to be limited to the extent of the breadth and scope of the claims appended hereto.

What is claimed:

1. In a cover for a dish for heating or cooking food in a microwave oven, said cover being formed of microwave-transparent paper, the improvement wherein:
   said paper includes, at least on the surface thereof facing said dish, a moisture resistant material,
   said cover is configured to provide a downwardly and outwardly sloping interior surface from the top to bottom, for preventing dripping of condensed moisture onto the food within said underlying dish, and said cover further comprises:
   means for reinforcing said paper cover, and
   means for trapping otherwise uninhibited moisture condensing on the interior surface thereof for revaporization.

2. A cover as claimed in claim 1, wherein said paper is a waxed paper.

3. The cover as claimed in claim 2, wherein said paper is a one side wet paper.

4. The cover as claimed in claim 2, wherein said paper is a two side wet paper.

5. The cover as claimed in claim 1, wherein said paper comprises a freezer paper having a water impervious plastic coating on said interior surface.

6. The cover as claimed in claim 1, wherein said cover is in the shape of a cone.

7. The cover as claimed in claim 1, wherein said cover is dome-shaped.

8. The cover as claimed in claim 1, wherein said cover is partially cut along two sides and a bottom, forming a flap joined by an integral hinge extending horizontally, whereby the flap tends to open outwardly and curl upwardly upon accumulation of moisture vapor during cooking and/or heating of the food, and which flap within the interior of said cover automatically straightens out and dries upon termination of the operation of the microwave oven and heating and/or cooking of the food.

9. The cover as claimed in claim 1, wherein said means for trapping moisture condensing on the interior surface of the cover comprises irregularly applied liquid impervious coating on the surface of the paper facing the dish constituting a primary trap for the collection of moisture droplets at nodes formed by the irregular applied coating.

10. The cover as claimed in claim 1, wherein said means for trapping moisture condensing on the interior surface of the cover comprises concentric ring-form embossments of concave configuration, facing in the direction of the interior of the cover at vertically spaced positions over the height of the cover to form moisture collection cavities limiting downward movement of condensate under gravity influence.

11. The cover as claimed in claim 1, wherein said means for trapping moisture condensing on the interior surface of the cover comprises a lip integral with the cover at a bottom edge of the cover, and folded radially inwardly, functioning as a container for condensed moisture running off the interior surface of the cover under gravity influence.

12. The cover as claimed in claim 1, wherein said means for reinforcing said cover comprises circumferentially spaced upwardly extending ribs over the height of the cover.

13. The cover as claimed in claim 1, wherein said cover includes an integral tab extending outwardly of the cover at the top thereof for manual handling of the cover by lifting the cover via said tab.

14. The cover as claimed in claim 2, wherein said cover is formed of 27 lb. weight waxed paper, consisting of an 18 lb. base paper with 9 lb wax coating thereon, and wherein
   said waxed paper is of approximately 2.2 mill in thickness.

15. The cover as claimed in claim 6, further comprising an open mesh frame having a conical configuration matching that of said cover and fitted internally thereof for supporting said cone shaped cover on said dish overlying said food.

16. The cover as claimed in claim 11, further including a ring positioned within said lip for weighting said bottom edge.

17. The cover as claimed in claim 9, wherein said means for trapping moisture condensing on the interior surface of the cover further comprises concentric ring-formed embossments of concave configuration, facing in the direction of the interior of the cover at vertically spaced positions over the height of the cover to form moisture collection cavities limiting downward movement of condensate under gravity influence.

18. The cover as claimed in claim 17, wherein said means for trapping moisture condensing on the interior surface of the cover further comprises a lip integral with the cover at a bottom edge of the cover, and folded radially inwardly, functioning as a container for condensed moisture running off the interior surface of the cover under gravity influence.

* * * * *